(12) United States Patent
Turner et al.

(10) Patent No.: US 12,359,008 B2
(45) Date of Patent: Jul. 15, 2025

(54) ALTERNATING COPOLYMERS OF SELECTED UNSYMMETRICALLY SUBSTITUTED STILBENES AND MALEIC ANHYDRIDE OR N-SUBSTITUTED MALEIMIDES

(71) Applicant: VIRGINIA TECH INTELLECTUAL PROPERTIES, INC., Blacksburg, VA (US)

(72) Inventors: Sam Richard Turner, Blacksburg, VA (US); Richard David Gandour, Blacksburg, VA (US); Chanelle J. Brown, Blacksburg, VA (US); Anna Steele, Blacksburg, VA (US); John B. Matson, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 0 days.

(21) Appl. No.: 17/947,803

(22) Filed: Sep. 19, 2022

(65) Prior Publication Data
US 2023/0089076 A1 Mar. 23, 2023

Related U.S. Application Data

(60) Provisional application No. 63/245,230, filed on Sep. 17, 2021.

(51) Int. Cl.
| | | |
|---|---|---|
| *C08F 222/08* | (2006.01) | |
| *C08F 2/08* | (2006.01) | |
| *C08F 212/32* | (2006.01) | |
| C08F 12/32 | (2006.01) | |
| C08F 22/06 | (2006.01) | |
| C08F 222/06 | (2006.01) | |

(52) U.S. Cl.
CPC .............. *C08F 222/08* (2013.01); *C08F 2/08* (2013.01); *C08F 212/32* (2013.01); *C08F 12/32* (2013.01); *C08F 22/06* (2013.01); *C08F 222/06* (2013.01)

(58) Field of Classification Search
CPC ...... C08F 222/06; C08F 222/08; C08F 22/06; C08F 12/32; C08F 212/32
See application file for complete search history.

(56) References Cited

U.S. PATENT DOCUMENTS

| | | | |
|---|---|---|---|
| 2,378,629 A | 6/1945 | Hanford et al. | |
| 2013/0217841 A1* | 8/2013 | Chiefari | C08F 2/01 526/64 |
| 2018/0155463 A1* | 6/2018 | Zhang | C08F 8/06 |

OTHER PUBLICATIONS

Mao, Min and S. Richard Turner, "Synthesis and characterization of highly functionalized polymers based on N, N, N', N'-tetraalkyl-4,4'-diaminostilbene and maleic anhydride" 2006, Polymer, 47, p. 8101-8105 (Year: 2006).*
Korotych, O.; Mondal, J.; Gattás-Asfura, K. M.; Hendricks, J.; Bruce, B. D., Evaluation of commercially available styrene-co-maleic acid polymers for the extraction of membrane proteins from spinach chloroplast thylakoids. Eur. Polym. J. 2019, 114, 485-500.
Craig, A. F.; Clark, E. E.; Sahu, I. D.; Zhang, R.; Frantz, N. D.; Al-Abdul-Wahid, M. S.; Dabney-Smith, C.; Konkolewicz, D.; Lorigan, G. A., Tuning the size of styrene-maleic acid copolymer-lipid nanoparticles (SMALPs) using RAFT polymerization for biophysical studies. Biochim. Biophys. Acta 2016, 1858 (11), 2931-2939.
Hall, S. C. L.; Tognoloni, C.; Price, G. J.; Klumperman, B.; Edler, K. J.; Dafforn, T. R.; Arnold, T., Influence of Poly (styrene-co-maleic acid) Copolymer Structure on the Properties and Self-Assembly of SMALP Nanodiscs. Biomacromolecules 2018, 19 (3), 761-772.
Smith, A. A. A.; Autzen, H. E.; Laursen, T.; Wu, V.; Yen, M.; Hall, A.; Hansen, S. D.; Cheng, Y.; Xu, T., Controlling Styrene Maleic Acid Lipid Particles through RAFT. Biomacromolecules 2017, 18 (11), 3706-3713.
Morrison, K. A.; Akram, A.; Mathews, A.; Khan, Z. A.; Patel, J. H.; Zhou, C.; Hardy, D. J.; Moore-Kelly, C.; Patel, R.; Odiba, V.; Knowles, T. J.; Javed, M.-u.-H.; Chmel, N. P.; Dafforn, T. R.; Rothnie, A. J., Membrane protein extraction and purification using styrene-maleic acid (SMA) copolymer: effect of variations in polymer structure. Biochem. J. 2016, 473 (23), 4349-4360.
Cunningham, R. D.; Kopf, A. H.; Elenbaas, B. O. W.; Staal, B. B. P.; Pfukwa, R.; Killian, J. A.; Klumperman, B., Iterative RAFT-Mediated Copolymerization of Styrene and Maleic Anhydride toward Sequence-and Length-Controlled Copolymers and Their Applications for Solubilizing Lipid Membranes. Biomacromolecules 2020, 21 (8), 3287-3300.
Esmaili, M.; Brown, C. J.; Shaykhutdinov, R.; Acevedo-Morantes, C.; Wang, Y. L.; Wille, H.; Gandour, R. D.; Turner, S. R.; Overduin, M., Homogeneous nanodiscs of native membranes formed by stilbene-maleic-acid copolymers. Nanoscale 2020, 12 (32), 16705-16709.
Ebdon, J. R.; Hunt, B. J.; Hussein, S., Radical copolymerisation of maleic anhydride with trans-stilbene. Brit. Poly. J.1987, 19 (3-4), 333-337.
Li, Y.; Turner, S. R., Free radical copolymerization of methyl substituted stilbenes with maleic anhydride. Eur. Polym. J. 2010, 46 (4), 821-828.
M. L. Hallensleben, Eur. Polym. J. 9, 1973, 227-231.

(Continued)

*Primary Examiner* — Ling Siu Choi
*Assistant Examiner* — David L Miller
(74) *Attorney, Agent, or Firm* — Lex Generalis, LLC; John S. Sears

(57) ABSTRACT

In one aspect, the disclosure relates to the production of alternating polymers of maleic anhydride or an N-substituted maleimide with a stilbene.

8 Claims, No Drawings

(56) References Cited

OTHER PUBLICATIONS

T. Tanaka, O. Vogl, Polymer, 6 (6) 1974, 522-531.
Ferguson et al. Macromolecules 2005, 38, 2191-2204.
Chanelle J. Brown, Richard D. Gandour, and S. Richard Turner, "Unsymmetrically Substituted Stilbene-Maleic-Anhydride Copolymers: Improving Synthesis and Measuring Substituent Effects on Conversion", Macromol. Chem. Phys. 2022, 2200217, DOI: 10.1002/macp.202200217.
Savage, et al., "Synthesis and Characterization of Double Hydrophilic Block Copolymers Containing Semi-Rigid and Flexible Segments", Journal of Polymer Science Part A Polymer Chemistry, 219-227, Jan. 2015.
Wagner-Jauregg, T., "Über addierende Hetero-polymerisation", Ber. Disch. Chem. Ges. (A and B Series) 1930, 63 (11), 3213-3224 with English abstract.

* cited by examiner

ALTERNATING COPOLYMERS OF SELECTED UNSYMMETRICALLY SUBSTITUTED STILBENES AND MALEIC ANHYDRIDE OR N-SUBSTITUTED MALEIMIDES

CROSS-REFERENCE TO RELATED APPLICATIONS

This Application claims the benefit of U.S. Provisional Application No. 63/245,230, filed on Sep. 17, 2021, which is incorporated herein by reference in its entirety.

STATEMENT REGARDING FEDERALLY SPONSORED RESEARCH

This invention was made with government support under awards DMR1609379 and DMR-160222 awarded by the National Science Foundation. The government has certain rights in the invention.

BACKGROUND

The alternating copolymer of stilbene and maleic anhydride was one of the first copolymers ever synthesized by radical copolymerization yet for many years its structure was claimed to be covalently crosslinked. Subsequently it was discovered that the insoluble copolymer could be dissolved in aqueous base—resulting in hydrolized succinic anhydride units in the chain; this discovery revealed the non-crosslinked structure of the copolymer.

Recently we discovered that the alternating copolymers of certain methyl stilbene alternating maleic anhydride (MAh) copolymers have excellent performance as polymeric surfactants to extract non-denatured protein membranes from lipid membranes. The copolymerization of monomethyl substituted stilbenes with MAh, however exhibits copolymer precipitation over the course of the polymerization. The precipitation, or crude product, often appears as a viscous gel, and such a result presents a barrier to controlling the molecular weight of the growing chain by conventional chain transfer reactions with an added chain transfer agent. This renders it difficult, if not impossible, to use controlled radical polymerization techniques for molecular weight. Increasing initiator concentration to control the growing chain length is also problematic due to this issue, seemingly a solubility problem. These problems make scale-up of small-scale laboratory copolymerizations very complex and difficult.

SUMMARY

As embodied and broadly described herein, the disclosure, in one aspect, relates to the synthesis of unsymmetrical disubstituted stilbene monomers, with one substituent on each phenyl ring. In another aspect, the disclosure relates to, the synthesis of alternating copolymers from the synthesized stilbene monomers. In another aspect, the disclosure relates to synthesis of unsymmetrical mono substituted methoxy stilbenes and the radical copolymerization the methoxy stilbenes with MAh to provide homogeneous, e.g., soluble, polymerization solutions. In another aspect, the disclosure relates to use of anhydrous anisole as a polymerization solvent yields homogenous polymerization solutions.

In another aspect, the disclosure includes a method of preparing an alternating copolymer of formula (I):

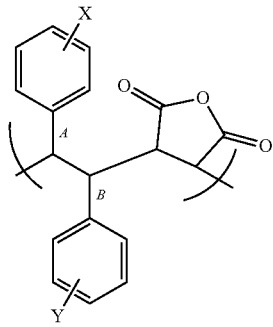

(I)

wherein X and Y are independently selected from the group consisting of $C_1$-$C_5$ alkyl, $C_1$-$C_5$ haloalkyl, halogen, cyano, $C(O)C_1$-$C_5$ alkyl, $C(O)O(C_1$-$C_5)$alkyl, amino, $NH(C_1$-$C_5$ alkyl), $N(C_1$-$C_5$ alkyl)$_2$, $O(C_1$-$C_5$ alkyl), and 1H-tetrazole, wherein each alkyl is independently selected; and wherein X and Y are simultaneously not the same, and wherein A and B are single bonds; the method comprising admixing a disubstituted stilbene of formula (II):

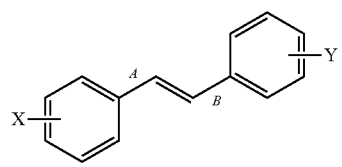

(II)

with maleic anhydride or an N-substituted maleimide, in a polymerization solvent, in the presence of a radical initiator, wherein the alternating copolymer of formula (I) is substantially homogeneously distributed in the polymerization solvent in which the alternating copolymer was prepared, wherein the absolute viscosity of a substantially homogeneous distribution and polymerization solvent admixture is from about 0.1 to 50 centipoises (cP) at 300° K.

In another aspect, the disclosure includes a method of preparing an alternating copolymer of formula (Ib):

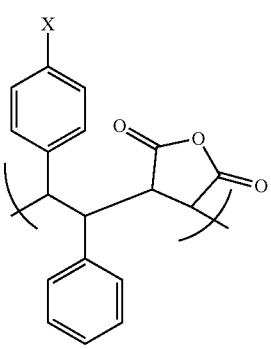

(Ib)

wherein X is selected from the group consisting of $C_1$-$C_5$ alkyl, $C_1$-$C_5$ haloalkyl, halogen, cyano, $C(O)(C_1$-$C_5)$alkyl, $C(O)O(C_1$-$C_5)$alkyl, amino, $NH(C_1$-$C_5)$alkyl), $N((C_1$-$C_5)$alkyl)$_2$, O(C$_1$-C$_5$)alkyl, and 1H-tetrazole, wherein each alkyl is independently selected, comprising admixiing maleic anhydride or an N-substituted maleimide, and a compound of formula (IIb):

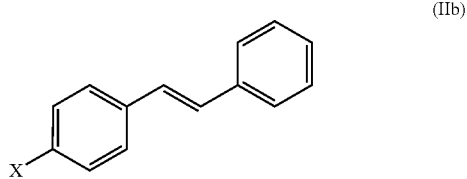

(IIb)

in a polymerization solvent, in the presence of a radical initiator and in the presence of a reversible addition-fragmentation transfer agent, wherein the fragmentation transfer agent is a trithiocarbonate Z—SC(S)S—R, where Z is an alkyl chain from 2 to 24 carbons, and R is a group that can fragment homolytically to form a stabilized radical, is admixed with the polymerization solvent, wherein the alternating copolymer of formula Ia is substantially homogeneously distributed in the polymerization solvent in which the alternating copolymer was prepared and wherein the absolute viscosity of a substantially homogeneous distribution and polymerization solvent admixture is from about 0.1 to 50 centipoise (cP) at 300° K.

In another aspect, the disclosure includes a method of preparing an alternating copolymer of formula (III):

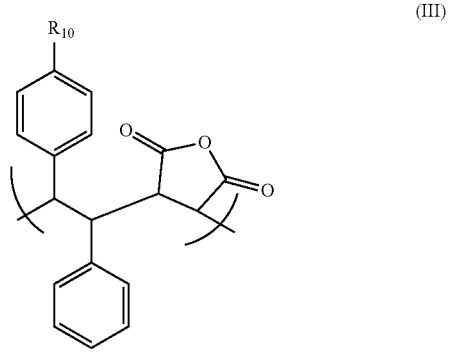

(III)

wherein $R_{10}$ is alkyl,
comprising admixing a stilbene of formula (IV):

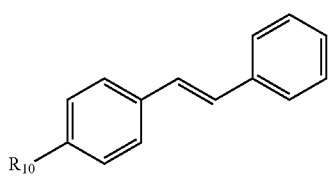

(IV)

with maleic anhydride or an N-substituted maleimide, in a polymerization solvent comprising anhydrous anisole, in the presence of a radical initiator, wherein the alternating copolymer of formula (III) is substantially homogeneously distributed in the polymerization solvent in which the alternating copolymer of formula III is prepared and wherein the absolute viscosity of the substantially homogeneous distribution in the polymerization solvent is from about 0.1 to 50 centipoise (cP) at 300° K.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all features and modifications of the described embodiments are usable in all aspects of the disclosure taught herein. Furthermore, the individual features of the dependent claims and modifications of the described embodiments are combinable and interchangeable with one another.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

A. Definitions

"$C_1$-$C_5$ alkyl" refers to a straight or branched chain saturated hydrocarbon containing 1-5 carbon atoms. Examples of a $C_1$-$C_5$ alkyl group include, but are not limited to, methyl, ethyl, propyl, butyl, pentyl, isopropyl, isobutyl, sec-butyl, tert-butyl, isopentyl and neopentyl.

Alkyl may be generally lower alkyl, or $C_1$-$C_6$ alkyl. Examples of a $C_1$-$C_6$ alkyl group include, but are not limited to, methyl, ethyl, propyl, butyl, pentyl, hexyl, isopropyl, isobutyl, sec-butyl, tert-butyl, isopentyl, neopentyl, and isohexyl.

Halogen may be F, Cl, Br or I; or F, Cl, or Br; or F or Cl; or F; or Cl.

Haloalkyl may be generally lower haloalkyl, or $C_1$-$C_6$ haloalkyl, or $C_1$-$C_3$ alkyl. Examples of $C_1$-$C_3$ haloalkyl include $CH_2F$, $CHF_2$, $CF_3$, $CH_2Cl$, $CHCl_2$, $CCl_3$, $CF_2CF_3$, $CF_2CF_2H$, and $CH_2CF_3$.

The term "dispersity" is meant the definition published in Pure Appl.Chem., Vol. 81, No. 2, pp. 351-353, 2009, incorporated by reference herein and relied upon.

The term homogeneous in adjective or adverbial form means of sufficient uniform dispersion as known by a person of ordinary skill in the art. A person of ordinary skill in the art of preparing alternating polymers may understand homogeneous to mean of sufficiently solubility of a polymer in a polymerization solvent such that the polymer appears soluble, e.g., with translucency and with no phase interfaces when viewing the polymer in the polymerization solvent.

The term "polymerization solvent" means a solvent sufficient to support a radical alternating polymerization as selected by one of ordinary skill in the art.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one value and/or to the other particular value. For example, where the stated range includes one or both of the limits, ranges excluding either or both of those included limits are also included in the disclosure, e.g., the phrase "x to y" includes the range from 'x' to 'y' as well as the range greater than 'x' and less than 'y'. The range can also be expressed as an upper limit, e.g., 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a an excipient or additive refers to an amount that is sufficient to achieve the desired improvement in the property modulated by the formulation component, e.g. achieving the desired level of modulus. The specific level in terms of wt % in a composition required as an effective amount will depend upon a variety of factors.

Unless otherwise specified, temperatures referred to herein are based on atmospheric pressure (i.e. one atmosphere).

The disclosure will be better understood upon reading the following aspects, which should not be confused with the claims. In some instances, the aspects below can be combined with other aspects below or with features described elsewhere in the disclosure.

Aspect 1. A method of preparing an alternating copolymer of formula (I):

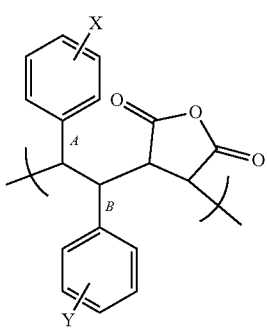

(I)

wherein X and Y are independently selected from the group consisting of $C_1$-$C_5$ alkyl, $C_1$-$C_5$ haloalkyl, halogen, cyano, $C(O)C_1$-$C_5$ alkyl, $C(O)OC_1$-$C_5$ alkyl, amino, $NH(C_1$-$C_5$ alkyl), $N(C_1$-$C_5$ alkyl)$_2$, $O(C_1$-$C_5$ alkyl), and 1H-tetrazole, wherein each alkyl is independently selected; and wherein X and Y are simultaneously not the same, and wherein A and B are single bonds; the method comprising admixing a disubstituted stilbene of formula (II):

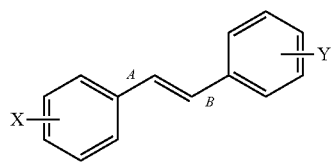

(II)

with maleic anhydride or an N-substituted maleimide, in a polymerization solvent, in the presence of a radical initiator, wherein the alternating copolymer of formula (I) is substantially homogeneously distributed in the polymerization solvent in which the alternating copolymer was prepared, wherein the absolute viscosity of a substantially homogeneous distribution and polymerization solvent admixture is from about 0.1 to 200 centipoises (cP) at 300° K.

Aspect 2. The method of aspect 1 wherein the compound of formula (I) reacts with maleic anhydride.

Aspect 3. The method of aspect 1 or 2 wherein the alternating copolymer is a substantially strictly alternating copolymer.

Aspect 4. The method of any one of the forgoing aspects wherein the compound of formula (I) reacts with an N-substituted maleimide.

Aspect 5. The method of any one of the forgoing aspects wherein the alternating copolymer is a substantially strictly alternating copolymer.

Aspect 6. The method of any one of the forgoing aspects wherein a ratio of a rate of formation of the alternating copolymer to a rate of homopolymerization of maleic anhydride in the polymerization solvent is from about $10^2$ to about $10^6$.

Aspect 7. The method of any one of the forgoing aspects wherein a ratio of a rate of formation of the alternating copolymer to a rate of homopolymerization of the stilbene of formula (II) is from about $10^2$ to about $10^6$.

Aspect 8. The method of any one of the forgoing aspects wherein a ratio of a rate of formation of the alternating copolymer to a rate of homopolymerization of the N-substituted maleimide is from about $10^2$ to about $10^6$.

Aspect 9. The method of any one of the forgoing aspects wherein a reversible addition-fragmentation transfer agent chain transfer agent of the trithiocarbonate structure Z-SC(S)S-R, where Z is an alkyl chain from 2 to 24 carbons, and R is a group that can fragment homolytically in the RAFT process to form a stabilized radical, such as a propanoic acid or propanoate ester group; or wherein Z-SC(S)S-R is selected from the group consisting of benzyl 2-(((dodecylthio)carbonothioyl)thio)-2-methylpropanoate, benzyl 2-(((dodecylthio)carbonothioyl)thio)propanoate, and 2-(((dodecylthio)carbonothioyl)thio)propanoic acid is admixed with the polymerization solvent.

Aspect 10. The method of any one of the forgoing aspects wherein the polymerization solvent comprises anhydrous anisole.

Aspect 11. The method of any one of the forgoing aspects wherein X is para to bond A.

Aspect 12. The method of any one of the forgoing aspects wherein X is meta to bond A.

Aspect 13. The method of any one of the forgoing aspects wherein X is ortho to bond A.

Aspect 14. The method of any one of the forgoing aspects wherein Y is para to bond B.

Aspect 15. The method of any one of the forgoing aspects wherein Y is meta to bond B.

Aspect 16. The method of any one of the forgoing aspects wherein Y is ortho to bond B.

Aspect 17. The method of any one of the forgoing aspects wherein the alternating copolymer has a substantially monomodal molecular weight distribution.

Aspect 18. The method of any one of the forgoing aspects wherein the alternating copolymer has a number average molecular weight (Mn) of from about 1 kilodaltons (kDa) to about 150 kDa, or from about 1 kDa to about 100 kDa, of from about 1 kDa to about 50 kDa.

Aspect 19. The method of any one of the forgoing aspects wherein the alternating copolymer has an Mn from about 1 kDa to about 40 kDa, or from about 1 kDa to about 30 kDa, or from about 1 kDa to about 20 kDa, or from about 1 kDa to about 15 kDa, or from about 1 kDa to about 10 kDa, or from about 5 kDa to about 50 kDa, or from about 5 kDa to about 30 kDa, or from about 5 kDa to about 20 kDa, or from about 5 kDa to about 15 kDa, or from about 5 kDa to about 10 kDa; or from about 10 kDa to about 50 kDa, or from about 10 kDa to about 30 kDa, or from about 10 kDa to about 20 kDa, or from about 15 kDa to about 20 kDa; or from about 15 kDa to about 50 kDa, or from about 15 kDa to about 30 kDa, or from about 15 kDa to about 20 kDa.

Aspect 20. The method of any one of the forgoing aspects wherein the copolymer has a monomodal molar mass distribution Aspect 21. The method of any one of the forgoing aspects wherein the dispersity index (Đ) is from about 1 to 5.

Aspect 22. The method of any one of the forgoing aspects wherein Đ is from about 1 to about 4.

Aspect 23. The method of any one of the forgoing aspects wherein Đ is from about 1 to about 3, or from about 1 to about 2.9, or from about 1 to about 2.8, or from about 1 to about 2.7, or from about 1 to about 2.6, or from about 1 to about 2.5 or from about 1 to about 2.4, or from about 1 to about 2.3, or from about 1 to about 2.2, or from about 1 to about 2.1, or from about 1 to about 2.0, or from about 1 to about 1.9, or from about 1 to about 1.8, or from about 1 to about 1.7, or from about 1 to about 1.6, or from about 1 to about 1.5 or from about 1 to about 1.4, or from about 1 to about 1.3, or from about 1 to about 1.2, or from about 1 to about 1.1.

Aspect 24. The method of any one of the forgoing aspects wherein Đ is from about 1.1 to about 3, or from about 1.1 to about 2.9, or from about 1.1 to about 2.8, or from about 1.1 to about 2.7, or from about 1.1 to about 2.6, or from about 1.1 to about 2.5 or from about 1.1 to about 2.4, or from about 1.1 to about 2.3, or from about 1.1 to about 2.2, or from about 1.1 to about 2.1, or from about 1.1 to about 2.0, or from about 1.1 to about 1.9, or from about 1.1 to about 1.8, or from about 1.1 to about 1.7, or from about 1.1 to about 1.6, or from about 1.1 to about 1.5 or from about 1.1 to about 1.4, or from about 1.1 to about 1.3, or from about 1.1 to about 1.2.

Aspect 25. The method of any one of the forgoing aspects wherein Đ is from about 1.2 to about 3, or from about 1.2 to about 2.9, or from about 1.2 to about 2.8, or from about 1.2 to about 2.7, or from about 1.2 to about 2.6, or from about 1.2 to about 2.5 or from about 1.2 to about 2.4, or from about 1.2 to about 2.3, or from about 1.2 to about 2.2, or from about 1.2 to about 2.1, or from about 1.2 to about 2.0, or from about 1.2 to about 1.9, or from about 1.2 to about 1.8, or from about 1.2 to about 1.7, or from about 1.2 to about 1.6, or from about 1.2 to about 1.5 or from about 1.2 to about 1.4, or from about 1.2 to about 1.3.

Aspect 26. The method of any one of the forgoing aspects wherein Đ is from about 1.3 to about 3, or from about 1.3 to about 2.9, or from about 1.3 to about 2.8, or from about 1.3 to about 2.7, or from about 1.3 to about 2.6, or from about 1.3 to about 2.5 or from about 1.3 to about 2.4, or from about 1.3 to about 2.3, or from about 1.3 to about 2.2, or from about 1.3 to about 2.1, or from about 1.3 to about 2.0, or from about 1.3 to about 1.9, or from about 1.3 to about 1.8, or from about 1.3 to about 1.7, or from about 1.3 to about 1.6, or from about 1.3 to about 1.5 or from about 1.3 to about 1.4.

Aspect 27. The method of any one of the forgoing aspects wherein Đ is from about 1.4 to about 3, or from about 1.4 to about 2.9, or from about 1.4 to about 2.8, or from about 1.4 to about 2.7, or from about 1.4 to about 2.6, or from about 1.4 to about 2.5 or from about 1.4 to about 2.4, or from about 1.4 to about 2.3, or from about 1.4 to about 2.2, or from about 1.4 to about 2.1, or from about 1.4 to about 2.0, or from about 1.4 to about 1.9, or from about 1.4 to about 1.8, or from about 1.4 to about 1.7, or from about 1.4 to about 1.6, or from about 1.4 to about 1.5.

Aspect 28. The method of any one of the forgoing aspects wherein the alternating copolymer of formula I is an alternating copolymer of formula Ia:

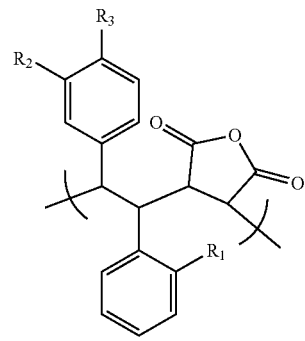

wherein when is $R_1$ and $R_3$ are hydrogen, $R_2$ is F; or
wherein when $R_1$ and $R_3$ are $CH_3$, $R_2$ is hydrogen; or
wherein when $R_1$ and $R_2$ are $CH_3$, $R_3$ is hydrogen; or
wherein when $R_1$ is $CH_3$ and $R_2$ is hydrogen, $R_3$ is N,N-diethylamino; and the compound of formula II is a compound of formula IIa:

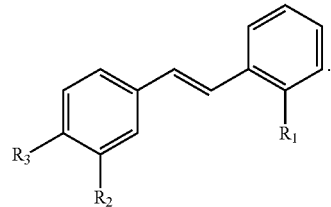

Aspect 29. A method of preparing an alternating copolymer of formula (Ib):

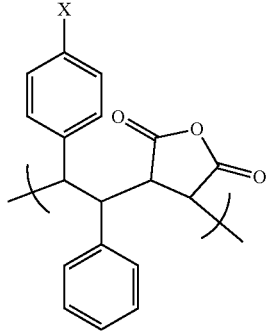

wherein X is selected from the group consisting of $C_1$-$C_5$ alkyl, $C_1$-$C_5$ haloalkyl, halogen, cyano, C(O)($C_1$-$C_5$)alkyl, C(O)O($C_1$-$C_5$)alkyl, amino, NH($C_1$-$C_5$)alkyl), N(($C_1$-$C_5$)alkyl)$_2$, O($C_1$-$C_5$)alkyl, and 1H-tetrazole, wherein each alkyl is independently selected, comprising admixiing maleic anhydride or an N-substituted maleimide, and a compound of formula (IIb):

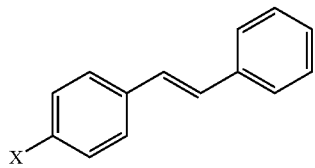

in a polymerization solvent, in the presence of a radical initiator and in the presence of a reversible addition-fragmentation transfer agent, wherein the fragmentation transfer agent is a trithiocarbonate Z—SC(S)S—R, where Z is an alkyl chain from 2 to 24 carbons, and R is a group that can fragment homolytically to form a stabilized radical, is admixed with the polymerization solvent, wherein the alternating copolymer of formula Ia is substantially homogeneously distributed in the polymerization solvent in which the alternating copolymer was prepared and wherein the absolute viscosity of a substantially homogeneous distribution and polymerization solvent admixture is from about 0.1 to 200 centipoise (cP) at 300° K.

Aspect 30. The method of aspect 29 wherein X is F, CI, Br, O($C_1$-$C_5$)alkyl, $CF_3$, CN, $COOCH_3$, or 1H-tetrazole.

Aspect 31. The method of aspect 29 or 30 wherein X is O($C_1$-$C_5$)alkyl.

Aspect 32. The method of any one of aspects 29-31 wherein X is $OCH_3$.

Aspect 33. The method of any one of aspects 29-32 wherein the compound of formula (I) reacts with maleic anhydride.

Aspect 34. The method of any one of aspects 29-33 wherein the alternating copolymer is a substantially strictly alternating copolymer.

Aspect 35. The method of any one of aspects 29-34 wherein the compound of formula (I) reacts with an N-substituted maleimide.

Aspect 36. The method of any one of aspects 29-35 wherein the alternating copolymer is a substantially strictly alternating copolymer.

Aspect 37. The method of any one of aspects 29-36 wherein a ratio of a rate of formation of the alternating copolymer to a rate of homopolymerization of maleic anhydride in the polymerization solvent is from about $10^2$ to about $10^6$.

Aspect 38. The method of any one of aspects 29-37 wherein a ratio of a rate of formation of the alternating copolymer to a rate of homopolymerization of the stilbene of formula (II) is from about $10^2$ to about $10^6$.

Aspect 39. The method of any one of aspects 29-38 wherein a ratio of a rate of formation of the alternating copolymer to a rate of homopolymerization of the N-substituted maleimide is from about $10^2$ to about $10^6$.

Aspect 40. The method of any one of aspects 29-39 wherein the polymerization solvent comprises anhydrous anisole.

Aspect 41. The method of any one of aspects 29-40 wherein the method of preparing is stopped about 1 hour after starting.

Aspect 42. The method of any one of aspects 29-41 wherein the alternating copolymer has a number average molecular weight (Mn) of from about 1 kilodaltons (kDa) to about 150 kDa, or from about 1 kDa to about 100 kDa, of from about 1 kDa to about 50 kDa.

Aspect 43. The method of any one of aspects 29-42 wherein the alternating copolymer has an Mn from about 1 kDa to about 40 kDa, or from about 1 kDa to about 30 kDa, or from about 1 kDa to about 20 kDa, or from about 1 kDa to about 15 kDa, or from about 1 kDa to about 10 kDa, or from about 5 kDa to about 50 kDa, or from about 5 kDa to about 30 kDa, or from about 5 kDa to about 20 kDa, or from about 5 kDa to about 15 kDa, or from about 5 kDa to about 10 kDa; or from about 10 kDa to about 50 kDa, or from about 10 kDa to about 30 kDa, or from about 10 kDa to about 20 kDa, or from about 15 kDa to about 20 kDa; or from about 15 kDa to about 50 kDa, or from about 15 kDa to about 30 kDa, or from about 15 kDa to about 20 kDa.

Aspect 44. The method of as any one of aspects 29-43 wherein 29 wherein the copolymer has a monomodal molar mass distribution Aspect 45. The method of as any one of aspects 29-44 wherein wherein the dispersity index (Đ) is from about 1 to 5.

Aspect 46. The method of any one of aspects 29-45 wherein Đ is from about 1 to about 4

Aspect 47. The method of any one of aspects 29-46 wherein Đ is from about 1 to about 3, or from about 1 to about 2.9, or from about 1 to about 2.8, or from about 1 to about 2.7, or from about 1 to about 2.6, or from about 1 to about 2.5 or from about 1 to about 2.4, or from about 1 to about 2.3, or from about 1 to about 2.2, or from about 1 to about 2.1, or from about 1 to about 2.0, or from about 1 to about 1.9, or from about 1 to about 1.8, or from about 1 to about 1.7, or from about 1 to about 1.6, or from about 1 to about 1.5 or from about 1 to about 1.4, or from about 1 to about 1.3, or from about 1 to about 1.2, or from about 1 to about 1.1, Aspect 48. The method of any one of aspects 29-47 wherein Đ is from about 1.1 to about 3, or from about 1.1 to about 2.9, or from about 1.1 to about 2.8, or from about 1.1 to about 2.7, or from about 1.1 to about 2.6, or from about 1.1 to about 2.5 or from about 1.1 to about 2.4, or from about 1.1 to about 2.3, or from about 1.1 to about 2.2, or from about 1.1 to about 2.1, or from about 1.1 to about 2.0, or from about 1.1 to about 1.9, or from about 1.1 to about 1.8, or from about 1.1 to about 1.7, or from about 1.1 to about 1.6, or from about 1.1 to about 1.5 or from about 1.1 to about 1.4, or from about 1.1 to about 1.3, or from about 1.1 to about 1.2.

Aspect 49. The method of any one of aspects 29-48 wherein Đ is from about 1.2 to about 3, or from about 1.2 to about 2.9, or from about 1.2 to about 2.8, or from about 1.2 to about 2.7, or from about 1.2 to about 2.6, or from about 1.2 to about 2.5 or from about 1.2 to about 2.4, or from about 1.2 to about 2.3, or from about 1.2 to about 2.2, or from about 1.2 to about 2.1, or from about 1.2 to about 2.0, or from about 1.2 to about 1.9, or from about 1.2 to about 1.8, or from about 1.2 to about 1.7, or from about 1.2 to about 1.6, or from about 1.2 to about 1.5 or from about 1.2 to about 1.4, or from about 1.2 to about 1.3.

Aspect 50. The method of any one of aspects 29-49 wherein Đ is from about 1.3 to about 3, or from about 1.3 to about 2.9, or from about 1.3 to about 2.8, or from about 1.3 to about 2.7, or from about 1.3 to about 2.6, or from about 1.3 to about 2.5 or from about 1.3 to about 2.4, or from about 1.3 to about 2.3, or from about 1.3 to about 2.2, or from about 1.3 to about 2.1, or from about 1.3 to about 2.0, or from about 1.3 to about 1.9, or from about 1.3 to about 1.8, or from about 1.3 to about 1.7, or from about 1.3 to about 1.6, or from about 1.3 to about 1.5 or from about 1.3 to about 1.4.

Aspect 51. The method of any one of aspects 29-50 wherein Đ is from about 1.4 to about 3, or from about 1.4 to about 2.9, or from about 1.4 to about 2.8, or from about 1.4 to about 2.7, or from about 1.4 to about 2.6, or from about 1.4 to about 2.5 or from about 1.4 to about 2.4, or from about 1.4 to about 2.3, or from about 1.4 to about 2.2, or from about 1.4 to about 2.1, or from about 1.4 to about 2.0, or from about 1.4 to about 1.9, or from about 1.4 to about 1.8, or from about 1.4 to about 1.7, or from about 1.4 to about 1.6, or from about 1.4 to about 1.5.

Aspect 52. A method of preparing an alternating copolymer of formula (III):

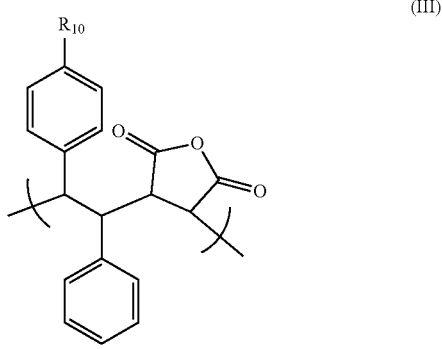

(III)

wherein $R_{10}$ is alkyl,
comprising admixing a stilbene of formula (IV):

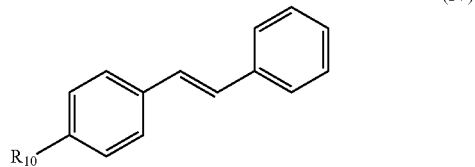

(IV)

with maleic anhydride or an N-substituted maleimide, in a polymerization solvent comprising anhydrous anisole, in the presence of a radical initiator, wherein the alternating copolymer of formula (III) is substantially homogeneously distributed in the polymerization solvent in which the alternating copolymer of formula III is prepared and wherein the absolute viscosity of the substantially homogeneous distribution in the polymerization solvent is from about 0.1 to 200 centipoise (cP) at 300° K.

Aspect 53. The method of aspect 52 wherein $R_{10}$ is $CH_3$.

Aspect 54. The method of aspect 52 or 53 wherein the alternating copolymer has a number average molecular weight (Mn) of from about 1 kilodaltons (kDa) to about 150 kDa, or from about 1 kDa to about 100 kDa, of from about 1 kDa to about 50 kDa.

Aspect 55. The method of any one of aspects 52-54 wherein the alternating copolymer has an Mn from about 1 kDa to about 40 kDa, or from about 1 kDa to about 30 kDa, or from about 1 kDa to about 20 kDa, or from about 1 kDa to about 15 kDa, or from about 1 kDa to about 10 kDa, or from about 5 kDa to about 50 kDa, or from about 5 kDa to about 30 kDa, or from about 5 kDa to about 20 kDa, or from about 5 kDa to about 15 kDa, or from about 5 kDa to about 10 kDa; or from about 10 kDa to about 50 kDa, or from about 10 kDa to about 30 kDa, or from about 10 kDa to about 20 kDa, or from about 15 kDa to about 20 kDa; or from about 15 kDa to about 50 kDa, or from about 15 kDa to about 30 kDa, or from about 15 kDa to about 20 kDa.

Aspect 56. The method of any one of aspects 52-55 wherein the copolymer has a monomodal molar mass distribution Aspect 57. The method of any one of aspects 52-56 wherein the dispersity index (Đ) is from about 1 to 5.

Aspect 58. The method of any one of aspects 52-57 wherein Đ is from about 1 to about 4.

Aspect 59. The method of any one of aspects 52-58 wherein Đ is from about 1 to about 3, or from about 1 to about 2.9, or from about 1 to about 2.8, or from about 1 to about 2.7, or from about 1 to about 2.6, or from about 1 to about 2.5 or from about 1 to about 2.4, or from about 1 to about 2.3, or from about 1 to about 2.2, or from about 1 to about 2.1, or from about 1 to about 2.0, or from about 1 to about 1.9, or from about 1 to about 1.8, or from about 1 to about 1.7, or from about 1 to about 1.6, or from about 1 to about 1.5 or from about 1 to about 1.4, or from about 1 to about 1.3, or from about 1 to about 1.2, or from about 1 to about 1.1, Aspect 60. The method of any one of aspects 52-59 wherein Đ is from about 1.1 to about 3, or from about 1.1 to about 2.9, or from about 1.1 to about 2.8, or from about 1.1 to about 2.7, or from about 1.1 to about 2.6, or from about 1.1 to about 2.5 or from about 1.1 to about 2.4, or from about 1.1 to about 2.3, or from about 1.1 to about 2.2, or from about 1.1 to about 2.1, or from about 1.1 to about 2.0, or from about 1.1 to about 1.9, or from about 1.1 to about 1.8, or from about 1.1 to about 1.7, or from about 1.1 to about 1.6, or from about 1.1 to about 1.5 or from about 1.1 to about 1.4, or from about 1.1 to about 1.3, or from about 1.1 to about 1.2.

Aspect 61. The method of any one of aspects 52-60 wherein Đ is from about 1.2 to about 3, or from about 1.2 to about 2.9, or from about 1.2 to about 2.8, or from about 1.2 to about 2.7, or from about 1.2 to about 2.6, or from about 1.2 to about 2.5 or from about 1.2 to about 2.4, or from about 1.2 to about 2.3, or from about 1.2 to about 2.2, or from about 1.2 to about 2.1, or from about 1.2 to about 2.0, or from about 1.2 to about 1.9, or from about 1.2 to about 1.8, or from about 1.2 to about 1.7, or from about 1.2 to about 1.6, or from about 1.2 to about 1.5 or from about 1.2 to about 1.4, or from about 1.2 to about 1.3.

Aspect 62 The method of any one of aspects 52-61 wherein Đ is from about 1.3 to about 3, or from about 1.3 to about 2.9, or from about 1.3 to about 2.8, or from about 1.3 to about 2.7, or from about 1.3 to about 2.6, or from about 1.3 to about 2.5 or from about 1.3 to about 2.4, or from about 1.3 to about 2.3, or from about 1.3 to about 2.2, or from about 1.3 to about 2.1, or from about 1.3 to about 2.0, or from about 1.3 to about 1.9, or from about 1.3 to about 1.8, or from about 1.3 to about 1.7, or from about 1.3 to about 1.6, or from about 1.3 to about 1.5 or from about 1.3 to about 1.4.

Aspect 63. The method of any one of aspects 52-62 wherein Đ is from about 1.4 to about 3, or from about 1.4 to about 2.9, or from about 1.4 to about 2.8, or from about 1.4 to about 2.7, or from about 1.4 to about 2.6, or from about 1.4 to about 2.5 or from about 1.4 to about 2.4, or from about 1.4 to about 2.3, or from about 1.4 to about 2.2, or from about 1.4 to about 2.1, or from about 1.4 to about 2.0, or from about 1.4 to about 1.9, or from about 1.4 to about 1.8, or from about 1.4 to about 1.7, or from about 1.4 to about 1.6, or from about 1.4 to about 1.5.

Aspect 64. The method of any one of aspects 52-63 further comprising a reversible addition-fragmentation transfer agent wherein the reversible addition fragmentation transfer agent is a trithiocarbonate Z—SC(S)S—R, where Z is an alkyl chain from 2 to 24 carbons, and R is a group that can fragment homolytically to form a stabilized radical; or wherein the reversible addition-fragmentation transfer agent is selected from the group consisting of benzyl 2-(((dodecylthio)carbonothioyl)thio)-2-methylpropanoate, benzyl 2-(((dodecylthio)carbonothioyl)thio)propanoate, and 2-(((dodecylthio)carbonothioyl)thio)propanoic acid.

Aspect 64. A compound selected from the group consisting of benzyl 2-(((dodecylthio)carbonothioyl)thio)-2-methylpropanoate, and benzyl 2-(((dodecylthio)carbonothioyl)thio)propanoate.

Aspect 65. An alternating copolymer of formula I prepared by the method of aspect 1.

Aspect 66. An alternating copolymer of formula I prepared by the method of aspect 29.

Aspect 67. An alternating copolymer of formula III prepared by the method of aspect 52.

Aspect 68. The method of any one of aspects 1, 29 or 52 wherein the radical initiator is dicumyl peroxide, a dialkyldiperoxide, such as di-tertbutyl diperoxide, or AIBN, also known as Azobisisobutyrylnitrile.

Aspect 69. The method of any one of the forgoing aspects wherein the ratio of the maleic anhydride to reversible addition-fragmentation transfer agent is from about 10:1 to 1000:1; or from about 10:1 to about 500:1, or from about 10:1 to about 300:1, or from about 10:1 to about 100:1, or from from about 10:1 to about 50:1; or from about 10:1 to about 25:1.

Aspect 70. The method of any one of the forgoing aspects wherein the ratio of the reversible addition-fragmentation transfer agent to the initiator is from about 2:1 to about 5:1.

Aspect 71. The method of any one of the forgoing aspects wherein the ratio of maleic anhydride to initiator is from about 50:1 to about 5000:1.

Aspect 72. The method of aspect 1 wherein the ratio of the compound of formula (I) to reversible addition-fragmentation transfer agent is from about 10:1 to 1000:1; or from about 10:1 to about 500:1, or from about 10:1 to about 300:1, or from about 10:1 to about 100:1, or from from about 10:1 to about 50:1; or from about 10:1 to about 25:1.

Aspect 73. The method of aspect 29 wherein the ratio of the compound of formula (Ia) to reversible addition-fragmentation transfer agent is from about 10:1 to 1000:1; or from about 10:1 to about 500:1, or from about 10:1 to about 300:1, or from about 10:1 to about 100:1, or from from about 10:1 to about 50:1; or from about 10:1 to about 25:1.

Aspect 74. The method of any one of the forgoing aspects wherein the ratio of the compound of formula (Ib) to reversible addition-fragmentation transfer agent is from about 10:1 to 1000:1; or from about 10:1 to about 500:1, or from about 10:1 to about 300:1, or from about 10:1 to about 100:1, or from from about 10:1 to about 50:1; or from about 10:1 to about 25:1.

From the foregoing, it will be seen that aspects herein are well adapted to attain all the ends and objects hereinabove set forth together with other advantages which are obvious and which are inherent to the structure.

While specific elements and steps are discussed in connection to one another, it is understood that any element and/or steps provided herein is contemplated as being combinable with any other elements and/or steps regardless of explicit provision of the same while still being within the scope provided herein.

It will be understood that certain aspects and subcombinations are of utility and may be employed without reference to other aspects and subcombinations. This is contemplated by and is within the scope of the features.

Since many possible aspects may be made without departing from the scope thereof, it is to be understood that all matter herein set forth or shown in the accompanying drawings and detailed description is to be interpreted as illustrative and not in a limiting sense.

It is also to be understood that the terminology used herein is for the purpose of describing particular aspects and is not intended to be limiting. The skilled artisan will recognize many variants and adaptations of the aspects described herein. These variants and adaptations are intended to be included in the teachings of this disclosure and to be encompassed by the features herein.

Now having described the aspects and features of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

B. EXAMPLES

The following examples are put forth to provide those of ordinary skill in the art with a complete disclosure and description of how the compounds, compositions, articles, devices and/or methods claimed herein are made and evaluated and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Comparative Example 1: The copolymerization of (E)-4-methylstilbene (0.99 g, 5.1 mmol) with maleic anhydride (0.50 g, 5.1 mmol) in the presence of the radical initiator AIBN (0.015 g, 1 wt %) in tetrahydrofuran (anhydrous, 10 mL) at 60° C. results in gelation after 2-3 hours. The gelled polymerization solution is precipitated to a white solid by slowly adding to hexanes and vacuum filtering. A yield of 0.46 g (31% yield) was obtained. The resulting copolymer is not completely THF soluble but is chloroform soluble; a slightly opaque solution results from dissolving the copolymer in THF. The copolymer (0.5 g) was also soluble in refluxing aqueous sodium hydroxide (10.0 N, 50 mL) after 24 hours. Poly((E)-4-methylstilbene-alt-maleic anhydride) was effective in the extraction of proteins from protein membranes1.

Comparative Example 2: The copolymerization of (E)-4,4'-dimethylstilbene (1.03 g, 5.0 mmol) with maleic anhydride (0.49 g, 5.0 mmol) in the presence of the radical initiator AIBN (0.015 g, 1 wt %) in tetrahydrofuran (anhydrous, 10 mL) at 60° C. results in gelation after 1 hour. The gel was added to hexanes and allowed to sit overnight. A white solid was collected and dried under vacuum overnight (1.27 g, 83.6% yield). The resulting copolymer is not soluble in THF or chloroform, making characterization unfeasible. The difficulty in polymerization and purification of this copolymer hinders its potential use in commercial applications.

Comparative Example 3: The terpolymerization of (E)-4-methylstilbene (0.50 g, 2.6 mmol), (E)-2-methyl stilbene (0.50 g, 2.6 mmol), and maleic anhydride (0.51 g, 5.2 mmol) in the presence of the radical initiator AIBN (0.015 g, 1 wt %) in tetrahydrofuran (anhydrous, 10 mL) at 60° C. results in gelation after 4 hours. The resulting gel was added to hexanes (300 mL) and allowed to sit overnight. A white precipitate was collected via filtration (0.41 g). A cloudy solution was observed when attempting to dissolve the white solid in THF, as well as chloroform.

Example 1: The copolymerization of the unsymmetrical (E)-2,4'-dimethylstilbene (1.00 g, 4.8 mmol) with maleic anhydride (0.47 g, 4.8 mmol) in the presence of the radical initiator dicumyl peroxide (0.015 g, 1 wt %) in chlorobenzene (anhydrous, 10 mL) at 110° C. does not result in gelation after 12 h. In addition to the lack of gelation, there is no apparent change in viscosity over the duration of the reaction. The reaction solution was added dropwise into stirring hexanes (300 mL). The white precipitate was collected via filtration and dissolved in THF (20 mL), the polymer solution was then added dropwise into stirring hexanes (300 mL). A white precipitate was collected via filtration and dried over vacuum overnight (1.14 g, 75.2% yield). Mn=27.5 KDa, Đ=1.7. The resulting copolymer readily dissolves in THF and chloroform, which results in fast purification and characterization by NMR and SEC.

Example 2: The copolymerization of (E)-4-methoxystilbene (1.50 g, 7.1 mmol) with maleic anhydride (0.70 g, 7.1 mmol) in the presence of the radical initiator AIBN (0.015 g, 1 wt %) in THF (anhydrous, 10 mL) at 110° C. does not result in gelation after 10 h. The reaction solution was added dropwise into stirring hexanes (300 mL). A white precipitate was collected via filtration and dissolved in THF (10 mL), the polymer solution was then added dropwise into stirring hexanes (300 mL). A white precipitate was collected via filtration and dried over vacuum overnight (1.37 g, 62.3% yield). Mn=67.5 KDa, Đ=2.5. The resulting copolymer readily dissolves in THF and chloroform, which results in fast purification and characterization by NMR and SEC.

Example 3: The copolymerization of (E)-4-methylstilbene (1.0 g, 5.1 mmol) with maleic anhydride (0.50 g, 5.1 mmol) in the presence of the radical initiator dicumyl peroxide (0.075 g, 5.44 mol %) in anisole (anhydrous, 10 mL) at 80 C does not result in gelation after 1 hour. The reaction solution was added dropwise into stirring ethanol (150 mL). A white precipitate was collected via filtration and dried in vacuo overnight (0.64 g, 42.33% yield). Mn=46 kDa, Đ=1.62.

Example 4: (E)-4-methylstilbene (1.0 g, 5.1 mmol), maleic anhydride (0.50 g, 5.1 mmol), radical initiator dicumyl peroxide (0.0054 g, 0.02 mmol), CTA1 (0.015 g, 0.04 mmol), and anisole (15 mL) were added to a 50-mL round-bottom flask equipped with a stir bar and sealed with a septum. The flask was placed under high vacuum for ~20 min and then sparged with Ar for ~15 min. The flask was placed in an oil bath at 120° C. for 24 h. No gelation over the course of the copolymerization was observed. The polymerization was quenched by removing the septum, the reaction mixture was added dropwise to stirring acetonitrile (150 mL). A yellow precipitate was collected via filtration and dried in vacuo at 80° C. overnight. (1.10 g, 73.0% yield). Mn=41 kDa. Đ=1.14.

Example 5: (E)-4-methylstilbene (0.70 g, 3.6 mmol), maleic anhydride (0.35 g, 3.6 mmol), radical initiator dibenzoyl peroxide (0.0070 g), CTA2 (0.066 g, 0.145 mmol), and anisole (10 mL) were added to a 50-mL round-bottom flask equipped with a stir bar and sealed with a septum. The flask was placed under high vacuum for ~20 min and then sparged with Ar for ~15 min. The flask was placed in an oil bath at 80° C. for 6 h. No gelation over the course of the copolymerization was observed. The polymerization was quenched by removing the septum, the opaque reaction mixture was added dropwise to stirring ethanol (100%, 150 mL). A yellow precipitate was collected via filtration and dried in vacuo at 80° C. overnight. (0.87 g, 82.28% yield). Mn=6700 Da. Đ=1.06.

Example 6: CTA2— benzyl 2-(((dodecylthio)carbonothioyl)thio)-2-methylpropanoate. 2-(((dodecylthio)carbonothioyl)thio)-2-methylpropanoic acid (4.00 g, 11.0 mmol) was dissolved in 55 mL of CH2Cl2 and added to a round-bottom flask equipped with a magnetic stir bar and rubber septum. 1-ethyl-3-(3'-dimethylaminopropyl)carbodiimide·HCl (2.31 g, 12.1 mmol) and a catalytic amount of 4-(dimethylamino)pyridine (13.4 mg, 110 µmol) were added to the reaction and stirred at room temperature for 15 min. Next, benzyl bromide (1.25 mL, 1.30 g, 12.1 mmol) was added dropwise via syringe through the septum, and the reaction mixture was stirred for 17 hours at rt. Once reaction completion was confirmed via TLC in CH2Cl2, the reaction mixture was diluted with 30 mL of CH2Cl2, transferred to an Erlenmeyer flask, and acidified with 1 N HCl (2×100 mL). The organic layer was removed using a separatory funnel and further washed with water (2×100 mL) and brine (2×100 mL), dried over $Na_2SO_4$, then concentrated under reduced pressure to yield a dark yellow oil. The crude product was purified by silica gel column chromatography in 60:40 hexanes:CH2Cl2, and the product-containing fractions ($R_f$~0.67) were combined and concentrated via rotatory evaporation to yield a yellow oil (2.1 g, 42%). $^1$H NMR (CDCl3, 400 MHz) was consistent with the expected structure.

Example 7: CTA3— benzyl 2-(((dodecylthio)carbonothioyl)thio)propanoate. 2-(((dodecylthio)carbonothioyl)thio)propanoic acid: 1-dodecanethiol (5.00 mL, 4.22 g, 20.9 mmol) was added to a suspension of potassium triphosphate (8.86 g, 41.7 mmol) in acetone (30 mL) and stirred for 15 minutes at rt in a round-bottom flask equipped with a magnetic stir bar and rubber septum. The reaction mixture was cooled to 0° C. on an ice bath, and carbon disulfide (3.78 mL, 4.77 g, 62.6 mmol) was added dropwise via syringe through the septum to give an opaque yellow solution. After complete addition, the ice bath was removed, and the reaction mixture was allowed to warm to rt. The reaction mixture was then stirred for an additional 30 min. Next, 2-bromopropanoic acid (2.30 mL, 3.83 g, 25.0 mmol) was added dropwise via syringe through the septum, and the resulting yellow transparent solution was stirred for 18 hours at room temperature. Once reaction completion was confirmed via TLC in $CH_2Cl_2$ the reaction mixture was diluted with 50 mL of $CH_2Cl_2$, transferred to an Erlenmeyer flask, and acidified with 1 N HCl (2×100 mL). The organic layer was removed using a separatory funnel and further washed with water (2×100 mL) and brine (2×100 mL), dried over $Na_2SO_4$, then concentrated under reduced pressure to yield a yellow solid. The crude product was purified by silica gel column chromatography in 90:10 $CH_2Cl_2$: EtOAc, and the product-containing fractions ($R_f$~0.33) were combined and concentrated via rotatory evaporation to yield bright yellow crystals (5.76 g, 79%). $^1$H NMR ($CDCl_3$, 400 MHz) was consistent with the expected structure.

2-(((dodecylthio)carbonothioyl)thio)propanoic acid (700 mg, 2.00 mmol) was dissolved in 10 mL of CH2Cl2 and added to a round-bottom flask equipped with a magnetic stir bar and rubber septum. 1-ethyl-3-(3'-dimethylaminopropyl)carbodiimide·HCl (421 mg, 2.20 mmol) and a catalytic amount of 4-(dimethylamino)pyridine (2.44 mg, 20.0 μmol) were added to the reaction mixture and stirred at rt for 15 min. Next, benzyl bromide (228 μL, 238 mg, 2.20 mmol) was added dropwise via syringe through the septum, and the reaction mixture was stirred for 4 hours at rt. Once reaction completion was confirmed via TLC in $CH_2Cl_2$ the reaction mixture was diluted with 10 mL of $CH_2Cl_2$, transferred to an Erlenmeyer flask, and acidified with 1 N HCl (2×25 mL). The organic layer was removed using a separatory funnel and further washed with water (2×25 mL) and brine (2×25 mL), dried over $Na_2SO_4$, then concentrated under reduced pressure to yield a yellow oil. The crude product was purified by silica gel column chromatography in 75:25 hexanes: $CH_2Cl_2$, and the product-containing fractions ($R_f$~0.70) were combined and concentrated via rotatory evaporation to yield a yellow oil (401 mg, 46%). $^1$H NMR (CDCl$_3$, 400 MHz) was consistent with the expected structure.

Example 8: Poly(4-cyano-4'-diethylaminostilbene-alt-maleic anhydride). 4-cyano-4'-diethylaminostilbene (1.41 g, 5.1 mmol), maleic anhydride (0.50 g, 5.1 mmol), AIBN (0.033 g, 4 mol %), and chlorobenzene (anhydrous, 15 mL) were added to a 50 mL round-bottom flask equipped with a stir bar and sealed with a septum. The flask was sparged with Ar for 15 min. The flask was placed in an oil bath at 65 C with stirring for 24 h. The polymerization was quenched by removing the septum. The reaction mixture was added dropwise to stirring diethyl ether. A yellow precipitate was collected via filtration and dried in vacuo overnight at 60 C. (1.37 g, 72.0% yield) Mn=7000 Da, Đ=1.32. Max excitation wavelength=340 nm. Emission at 340 nm=490 nm.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method of preparing an alternating copolymer having repeat units according to formula (I):

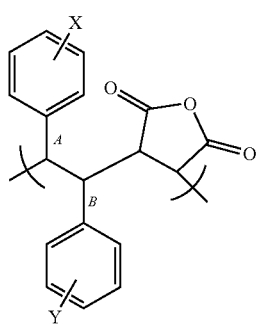

(I)

wherein X is $OCH_3$ and Y is selected from the group consisting of $C_1$-$C_5$ alkyl, $C_1$-$C_5$ haloalkyl, halogen, cyano, C(O) $C_1$-$C_5$ alkyl, C(O)O$C_1$-$C_5$ alkyl, amino, NH($C_1$-$C_5$ alkyl), N($C_1$-$C_5$ alkyl)$_2$, O($C_2$-$C_5$ alkyl), and 1H-tetrazole, wherein each alkyl is independently selected; and wherein X and Y are simultaneously not the same, and wherein A and B are single bonds; the method comprising admixing a disubstituted stilbene of formula (II):

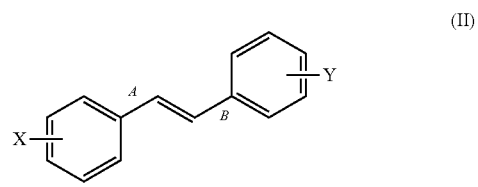

(II)

with maleic anhydride, in a polymerization solvent, in the presence of a radical initiator, wherein the alternating copolymer of formula (I) is substantially homogeneously distributed in the polymerization solvent in which the alternating copolymer was prepared to produce an admixture with an absolute viscosity from about 0.1 to 200 centipoises (cP) at 300° K.

2. The method of claim 1 wherein a reversible addition-fragmentation transfer agent of trithiocarbonate structure Z—SC(S)S-R, where Z is an alkyl chain from 2 to 24 carbons, and R is a group that can fragment homolytically to form a stabilized radical, is admixed with the polymerization solvent.

3. The method of claim 2 wherein the Z—SC(S)S-R is selected from the group consisting of benzyl 2-(((dodecylthio)carbonothioyl)thio)-2-methylpropanoate, benzyl 2-(((dodecylthio)carbonothioyl)thio)propanoate, and 2-(((dodecylthio)carbonothioyl)thio)propanoic acid.

4. The method of claim 1 wherein X is para to bond A.

5. The method of claim 1 wherein Y is para to bond B.

6. The method of claim 1 wherein the alternating copolymer has a substantially monomodal molecular weight distribution.

7. The method of claim 1 wherein the alternating copolymer has a number average molecular weight (Mn) of from about 1 kilodaltons (kDa) to about 150 kDa.

8. The method of claim 1 wherein the dispersity index (Đ) is from about 1 to about 5.

* * * * *